United States Patent
Lou et al.

(10) Patent No.: US 9,288,504 B2
(45) Date of Patent: Mar. 15, 2016

(54) METHOD AND APPARATUS FOR FAST GEOMETRIC MODE DESICION IN A VIDEO ENCODER

(75) Inventors: Jian Lou, Seattle, WA (US); Oscar Divorra Escoda, Barcelona (ES); Peng Yin, Plainsboro, NJ (US); Xiaoan Lu, Princeton, NJ (US)

(73) Assignee: Thomson Licensing, Boulogne-Billancourt (FR)

( * ) Notice: Subject to any disclaimer, the term of this patent is extended or adjusted under 35 U.S.C. 154(b) by 1614 days.

(21) Appl. No.: 12/450,695

(22) PCT Filed: Apr. 3, 2008

(86) PCT No.: PCT/US2008/004353
§ 371 (c)(1),
(2), (4) Date: Oct. 7, 2009

(87) PCT Pub. No.: WO2008/127568
PCT Pub. Date: Oct. 23, 2008

(65) Prior Publication Data
US 2010/0118959 A1    May 13, 2010

Related U.S. Application Data

(60) Provisional application No. 60/911,486, filed on Apr. 12, 2007.

(51) Int. Cl.
*H04N 11/02*  (2006.01)
*H04N 19/543*  (2014.01)
*H04N 19/196*  (2014.01)
*H04N 19/61*  (2014.01)
*H04N 19/103*  (2014.01)

(52) U.S. Cl.
CPC .......... *H04N 19/543* (2014.11); *H04N 19/103* (2014.11); *H04N 19/196* (2014.11); *H04N 19/197* (2014.11); *H04N 19/61* (2014.11)

(58) Field of Classification Search
None
See application file for complete search history.

(56) References Cited

U.S. PATENT DOCUMENTS

| | | | |
|---|---|---|---|
| 2006/0104359 A1* | 5/2006 | Zhou et al. | 375/240.16 |
| 2006/0193385 A1* | 8/2006 | Yin et al. | 375/240.12 |
| 2009/0268810 A1* | 10/2009 | Dai | 375/240.12 |

FOREIGN PATENT DOCUMENTS

| | | |
|---|---|---|
| JP | 2005-277968 | 10/2005 |
| JP | 2009-545919 | 12/2009 |
| JP | 2009-545920 | 12/2009 |
| JP | 2010-505343 | 2/2010 |

(Continued)

OTHER PUBLICATIONS

Hung et al.:"On Macroblock Partition for Motion Compensation," IEEE 2006, ICIP 2006, Oct. 1, 2006, pp. 1697-1700, XP031048982.

(Continued)

*Primary Examiner* — Frederick Bailey
(74) *Attorney, Agent, or Firm* — Robert D. Shedd; Vincent E Duffy; Gregory Weaver (57) ABSTRACT

There are provided methods and apparatus for fast geometric mode decision in a video encoder. An apparatus includes an encoder for performing a non-exhaustive geometric mode decision using geometric model-based partitioning modes. The encoder skips a testing of the geometric model-based partitioning modes based on at least one of a correlation and a dependence between the geometric model-based partitioning modes and non-geometric partitioning modes.

14 Claims, 8 Drawing Sheets

(56) References Cited

FOREIGN PATENT DOCUMENTS

| WO | 2006/052577 | A2 | 5/2006 |
|---|---|---|---|
| WO | 2008/016605 | A2 | 2/2008 |
| WO | 2008/016609 | A2 | 2/2008 |
| WO | 2008/042127 | A2 | 4/2008 |

OTHER PUBLICATIONS

Kondo et al.:"A Motion Compensation Technique Using Sliced Blocks in Hybrid Video Coding," IEEE 2005, Sep. 11, 2005, vol. 2, pp. 305-308, XP0010851050.

Chang et al.:"Edge-Based Motion Estimation and Region-Based Contour Tracing for very low bit rate video coding," Journal of Electronic Imaging, Jan. 1, 1998, vol. 7, (1), pp. 127-135, XP00732633.

Escoda et al.:"Geometry-Adaptive Block Partitioning for Video Coding," ICASSP2007, IEEE 2007, Apr. 15, 2007, vol. 1, pp. I-657-I660, XP007904123.

Divorra et al.:"Geometry-Adaptive Block Partioning," ITU-Telecommunications Standardization Sector, Video Coding Experts Groups(VCEG) VCEG-AF10, Apr. 19, 2007, pp. 1-8, XP030003531.

International Search Report dtd. Feb. 25, 2009.

\* cited by examiner

METHOD AND APPARATUS FOR FAST GEOMETRIC MODE DESICION IN A VIDEO ENCODER

CROSS-REFERENCE TO RELATED APPLICATIONS

This application claims the benefit, under 35 U.S.C. §365 of International Application PCT/US2008/004353 filed Apr. 3, 2008, which was published in accordance with PCT Article 21(2) on Oct. 23, 2008 in English and which claims the benefit of U.S. provisional patent application No. 60/911,486 filed Apr. 12, 2007.

TECHNICAL FIELD

The present principles relate generally to video encoding and, more particularly, to methods and apparatus for fast geometric mode decision in a video encoder.

BACKGROUND

In the International Organization for Standardization/International Electrotechnical Commission (ISO/IEC) Moving Picture Experts Group-4 (MPEG-4) Part 10 Advanced Video Coding (AVC) standard/International Telecommunication Union, Telecommunication Sector (ITU-T) H.264 recommendation (hereinafter the "MPEG-4 AVC Standard"), inter-coded 16×16 pixel macroblocks may be broken into macroblock partitions, of sizes 16×8, 8×16, or 8×8. Macroblock partitions of 8×8 pixels are also known as sub-macroblocks. Sub-macroblocks may be further broken into sub-macroblock partitions, of sizes 8×4, 4×8, and 4×4. An encoder may select how to divide the macroblock into partitions and sub-macroblock partitions based on the characteristics of a particular macroblock, in order to maximize compression efficiency and subjective quality.

Furthermore, the MPEG-4 AVC Standard also supports INTRA, SKIP and DIRECT modes. Intra modes allow three types: INTRA4×4, INTRA16×16, and INTRA8×8 which is a Fidelity Range extensions mode only. INTRA4×4 and INTRA8×8 support 9 prediction modes: vertical; horizontal; DC, diagonal down/left; diagonal down/right; vertical-left; horizontal-down; vertical-right; and horizontal-up prediction. INTRA16×16 supports 4 prediction modes: vertical; horizontal; DC; and plane prediction.

As for mode decision, intra pictures should support intra modes, while inter pictures should support both inter and intra modes. Intra modes include INTRA4×4 and INTRA16×16. For P pictures, inter modes include SKIP and 16×16, 16×8, 8×16 and sub-macroblock 8×8 partitions. 8×8 further supports 8×8, 8×4, 4×8 and 4×4 partitions. For B pictures, consideration of both list 0 and list 1 and DIRECT mode are also considered for both macroblocks and sub-macroblocks.

In the prior art, a Rate-Distortion Optimization (RDO) framework is used for mode decision, i.e., an RDcost J=D+λR is used to measure the coding cost where D represents distortion and R represents the rate. For inter modes, motion estimation is separately considered from mode decision. Motion estimation is first performed for all block types of inter modes, then the mode decision is made by comparing the cost of each inter mode and intra mode. The mode with the minimal cost is selected as the best mode.

A conventional procedure to encode one macroblock s in a P- or B-picture (hereinafter the "conventional macroblock encoding procedure") is summarized as follows.

In a first step of the conventional macroblock encoding procedure, given the last decoded pictures, we decide the Lagrangian multiplier $\lambda_{MODE}$, $\lambda_{MOTION}$, and the macroblock quantizer QP.

In a second step of the conventional macroblock encoding procedure, motion estimation and reference picture selection are performed by minimizing $$J(REF,m(REF)|\lambda_{MOTION})=SA(T)D(s,c(REF,m(REF)))+\lambda_{MOTION}(R(m(REF)-p(REF))+R(REF))$$

for each reference picture and motion vector of a possible macroblock mode. In the preceding equation, J denotes the rate-distortion cost, REF denotes the reference picture, m denotes the current motion vector being considered, $\lambda_{MOTION}$ denotes the Lagrangian multiplier, c(REF,m(REF)) denotes the compensation operation using reference REF with motion vector m, p denotes the motion vector used for the prediction during motion vector coding, R(m-p) denotes the bits used for coding the motion vector and R(REF) denotes the bits for coding the reference picture. SAD denotes the Sum of Absolute Differences between the original signal and the reference signal predicted by the motion vector.

In a third step of the conventional macroblock encoding procedure, the macroblock prediction mode is chosen by minimizing $$J(s,c,MODE|QP,\lambda_{MODE})=SSD(s,c,MODE|QP)+\lambda_{MODE} \cdot R(s,c,MODE|QP),$$

given QP and $\lambda_{MODE}$ when varying MODE. SSD denotes the Sum of Square Differences between the original signal and the reconstructed signal. R(s,c,MODE) denotes the number of bits associated with choosing MODE, including the bits for the macroblock header, the motion and all DCT coefficients. MODE indicates a mode out of the set of potential macroblock modes, as follows:

$$P\text{-frame: MODE} \in \begin{Bmatrix} INTRA4 \times 4, INTRA16 \times 16, \\ INTRA8 \times 8, SKIP, \\ 16 \times 16, 16 \times 8, 8 \times 16, 8 \times 8, \\ 8 \times 4, 4 \times 8, 4 \times 4 \end{Bmatrix},$$

$$B\text{-frame: MODE} \in \begin{Bmatrix} INTRA4 \times 4, INTRA16 \times 16, INTRA8 \times 8, \\ BIDIRECT, DIRECT, FWD16 \times 16, \\ FWD16 \times 8, FWD8 \times 16, FWD8 \times 8, \\ FWD8 \times 4, FWD4 \times 8, FWD4 \times 4, \\ BAK16 \times 16, BAK16 \times 8, BAK8 \times 16, \\ BAK8 \times 8, BAK8 \times 4, BAK4 \times 8, BAK4 \times 4 \end{Bmatrix}$$

INTRA4×4 includes modes:

$$MODE \in \begin{Bmatrix} \text{vertical, horizontal, } DC, \text{ diagonal-down/left,} \\ \text{diagonal-down/right, vertical-left,} \\ \text{horizontal-down, vertical-right, horizontal-up} \end{Bmatrix}$$

INTRA16×16/INTRA8×8 include modes:
MODE ∈ {vertical, horizontal, DC, plane}

Frame partitioning is a process of key importance in efficient video coding. Recent video compression technologies such as the MPEG-4 AVC Standard use a tree-based frame partition. This seems to be more efficient than a simple uniform block partition, typically used in older video coding standards and recommendations such as the International Organization for Standardization/International Electrotechnical Commission (ISO/IEC) Moving Picture Experts Group-2 (MPEG-2) Standard and the International Telecommunication Union, Telecommunication Sector (ITU-T) H.263 Recommendation (hereinafter the "H.263 Recommendation"). However, tree-based frame partitioning still does not code the video information as efficiently as possible, as it is unable to efficiently capture the geometric structure of two-dimensional (2D) data.

Inter and Intra prediction using geometric region partitioning has been identified as a promising research direction on improving video coding efficiency. Previously, for advanced video coding (such as that performed in accordance with the MPEG-4 AVC Standard), it has been proposed to introduce a geometric partition for inter and intra prediction to improve video coding efficiency. To get the best performance, it is critical for the encoder to find the optimal geometric partition. A brute-force full search strategy is used in these proposals, but the complexity is very high. However, it is desirable to have some fast algorithms for mode/partition selection so the increased computational complexity for geometric partition does not become an obstacle to the practical system.

Previously proposed was a fast algorithm developed based on edge detection in order to pre-select candidate partition lines for inter geometric mode. This fast algorithm is based on the assumption that geometric partitioning for motion compensation is expected to work better for blocks that fall along object boundaries. Up to some extent, it is reasonable to assume that pre-selecting partitions based on the image edges may achieve satisfactory results. The main disadvantage of this approach is that it is fully driven by very simple statistics and ad-hoc modeling. This results in only a part of the possible situations where geometric partitioning is useful to be actually considered, thus achieving sub-optimal results in terms of complexity savings and compression savings. Indeed, the authors of this fast algorithm assume that partitions are only related with explicit image edges. However, this is not necessarily true. For example, for an inter prediction case, partitions reflect motion boundaries rather than image edges. In some cases, image edges can coincide with motion boundaries, but not in all cases. Hence, this fast algorithm may cause a big drop in coding efficiency compared to the full search algorithm.

SUMMARY

These and other drawbacks and disadvantages of the prior art are addressed by the present principles, which are directed to methods and apparatus for fast geometric mode decision in a video encoder.

According to an aspect of the present principles, there is provided an apparatus. The apparatus includes an encoder for performing a non-exhaustive geometric mode decision using geometric model-based partitioning modes. The encoder skips a testing of the geometric model-based partitioning modes based on at least one of a correlation and a dependence between the geometric model-based partitioning modes and non-geometric partitioning modes.

According to another aspect of the present principles, there is provided a method. The method includes performing a non-exhaustive geometric mode decision using geometric model-based partitioning modes. The performing step includes skipping a testing of the geometric model-based partitioning modes based on at least one of a correlation and a dependence between the geometric model-based partitioning modes and non-geometric partitioning modes.

According to yet another aspect of the present principles, there is provided an apparatus. The apparatus includes an encoder for performing non-exhaustive geometric parameter selection using geometric model-based partitioning modes. The encoder performs the non-exhaustive geometric parameter selection by applying at least one of a predictive search and a hierarchical search. The predictive search includes at least one of an initial predictor selection, an adaptive early termination, and a predictor refinement.

According to still another aspect of the present principles, there is provided a method. The method includes performing a non-exhaustive geometric parameter selection using geometric model-based partitioning modes. The performing step includes applying at least one of a predictive search and a hierarchical search. The predictive search includes at least one of an initial predictor selection, an adaptive early termination, and a predictor refinement.

According to a further aspect of the present principles, there is provided a method. The method includes encoding video signal data for an image using geometric model-based partitioning modes. The encoding step encodes the video signal data using an alternate optimization of geometric partition parameters and prediction data for at least a portion of the image.

These and other aspects, features and advantages of the present principles will become apparent from the following detailed description of exemplary embodiments, which is to be read in connection with the accompanying drawings.

BRIEF DESCRIPTION OF THE DRAWINGS

The present principles may be better understood in accordance with the following exemplary figures, in which.

DETAILED DESCRIPTION

The present principles are directed to methods and apparatus for fast geometric mode decision in a video encoder.

The present description illustrates the present principles. It will thus be appreciated that those skilled in the art will be able to devise various arrangements that, although not explicitly described or shown herein, embody the present principles and are included within its spirit and scope.

All examples and conditional language recited herein are intended for pedagogical purposes to aid the reader in understanding the present principles and the concepts contributed by the inventor(s) to furthering the art, and are to be construed as being without limitation to such specifically recited examples and conditions.

Moreover, all statements herein reciting principles, aspects, and embodiments of the present principles, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the present principles. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read-only memory ("ROM") for storing software, random access memory ("RAM"), and non-volatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The present principles as defined by such claims reside in the fact that the functionalities provided by the various recited means are combined and brought together in the manner which the claims call for. It is thus regarded that any means that can provide those functionalities are equivalent to those shown herein.

Reference in the specification to "one embodiment" or "an embodiment" of the present principles means that a particular feature, structure, characteristic, and so forth described in connection with the embodiment is included in at least one embodiment of the present principles. Thus, the appearances of the phrase "in one embodiment" or "in an embodiment" appearing in various places throughout the specification are not necessarily all referring to the same embodiment.

It is to be appreciated that the use of the term "and/or", for example, in the case of "A and/or B", is intended to encompass the selection of the first listed option (A), the selection of the second listed option (B), or the selection of both options (A and B). As a further example, in the case of "A, B, and/or C", such phrasing is intended to encompass the selection of the first listed option (A), the selection of the second listed option (B), the selection of the third listed option (C), the selection of the first and the second listed options (A and B), the selection of the first and third listed options (A and C), the selection of the second and third listed options (B and C), or the selection of all three options (A and B and C). This may be extended, as readily apparent by one of ordinary skill in this and related arts, for as many items listed.

Moreover, it is to be appreciated that while one or more embodiments of the present principles are described herein with respect to the MPEG-4 AVC standard, the present principles are not limited to solely this standard and, thus, may be utilized with respect to other video coding standards, recommendations, and extensions thereof, including extensions of the MPEG-4 AVC standard, while maintaining the spirit of the present principles.

Further, as used herein, the phrases "wedge partition" and "wedge partitioning" refer to a partition of an image block into two regions that are separated by an arbitrary line or curve. Also, the word "wedge" refers to a partitioning shape given a particular setting and/or selection of the boundary line or curve.

Also, as used herein, for example, with respect to searching, the term "fast" refers to an efficient algorithm being able to find the optimal solution or a solution close to the optimal but with a lower computational complexity than the intensive full search algorithm.

Figure 1:
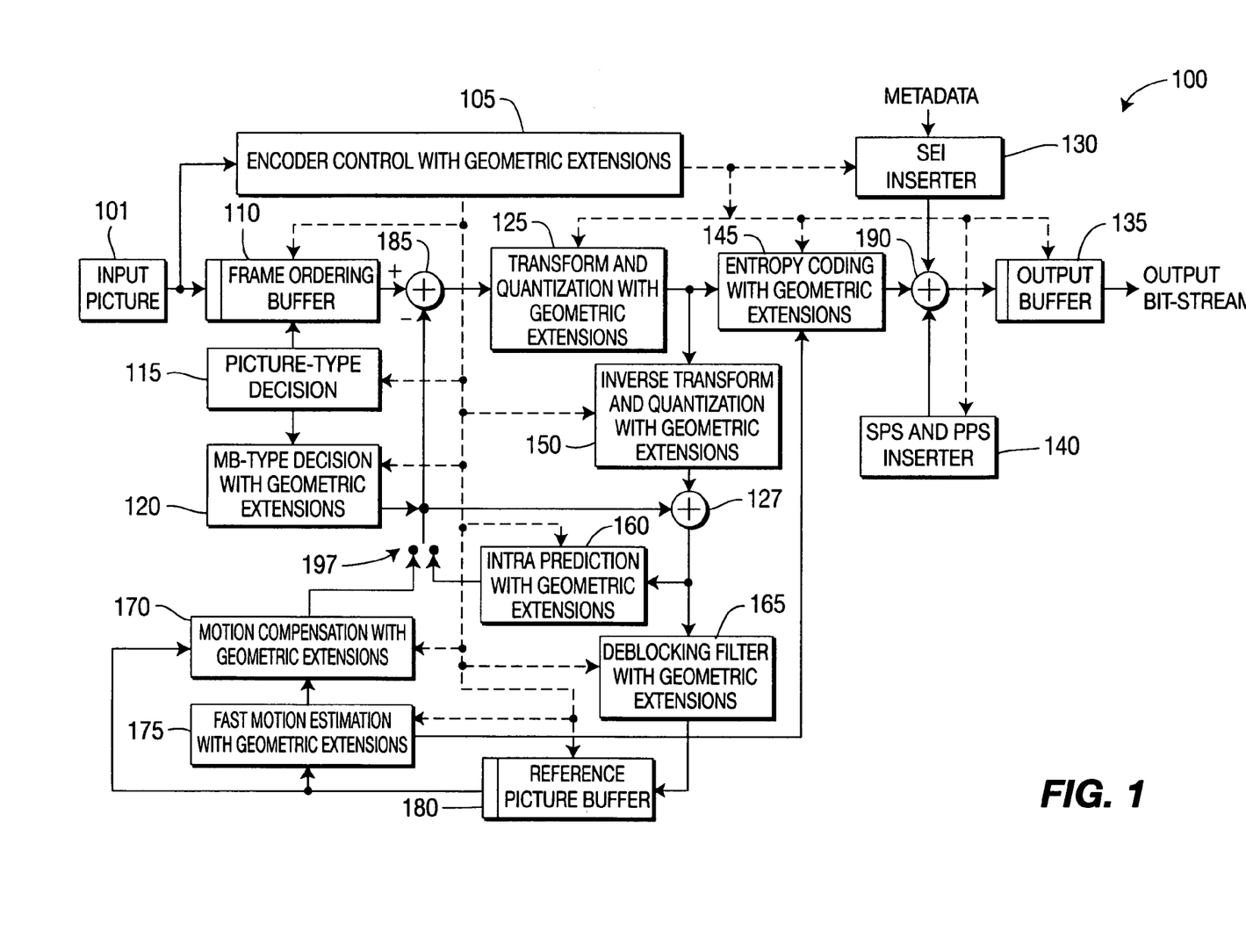
FIG. 1 is a block diagram for a video encoder capable of performing video encoding in accordance with the MPEG-4 AVC Standard, extended for use with the present principles, according to an embodiment of the present principles.

Turning to FIG. 1, a video encoder capable of performing video encoding in accordance with the MPEG-4 AVC standard, extended for use with the present principles, is indicated generally by the reference numeral 100.

The video encoder 100 includes a frame ordering buffer 110 having an output in signal communication with a non-inverting input of a combiner 185. An output of the combiner 185 is connected in signal communication with a first input of a transformer and quantizer with geometric extensions 125. An output of the transformer and quantizer with geometric extensions 125 is connected in signal communication with a first input of an entropy coder with geometric extensions 145 and a first input of an inverse transformer and inverse quantizer with geometric extensions 150. An output of the entropy coder with geometric extensions 145 is connected in signal communication with a first non-inverting input of a combiner 190. An output of the combiner 190 is connected in signal communication with a first input of an output buffer 135.

A first output of an encoder controller with geometric extensions 105 is connected in signal communication with a second input of the frame ordering buffer 110, a second input of the inverse transformer and inverse quantizer with geometric extensions 150, an input of a picture-type decision module 115, an input of a macroblock-type (MB-type) decision module with geometric extensions 120, a second input of an intra prediction module with geometric extensions 160, a second input of a deblocking filter with geometric extensions 165, a first input of a motion compensator with geometric extensions 170, a first input of a fast motion estimator with geometric extensions 175, and a second input of a reference picture buffer 180.

A second output of the encoder controller with geometric extensions 105 is connected in signal communication with a first input of a Supplemental Enhancement Information (SEI) inserter 130, a second input of the transformer and quantizer with geometric extensions 125, a second input of the entropy coder with geometric extensions 145, a second input of the output buffer 135, and an input of the Sequence Parameter Set (SPS) and Picture Parameter Set (PPS) inserter 140.

A first output of the picture-type decision module 115 is connected in signal communication with a third input of a frame ordering buffer 110. A second output of the picture-type decision module 115 is connected in signal communication with a second input of a macroblock-type decision module with geometric extensions 120.

An output of the Sequence Parameter Set (SPS) and Picture Parameter Set (PPS) inserter 140 is connected in signal communication with a third non-inverting input of the combiner 190.

An output of the inverse quantizer and inverse transformer with geometric extensions 150 is connected in signal communication with a first non-inverting input of a combiner 127. An output of the combiner 127 is connected in signal communication with a first input of the intra prediction module with geometric extensions 160 and a first input of the deblocking filter with geometric extensions 165. An output of the deblocking filter with geometric extensions 165 is connected in signal communication with a first input of a reference picture buffer 180. An output of the reference picture buffer 180 is connected in signal communication with a second input of the fast motion estimator with geometric extensions 175. A first output of the fast motion estimator with geometric extensions 175 is connected in signal communication with a second input of the motion compensator with geometric extensions 170. A second output of the fast motion estimator with geometric extensions 175 is connected in signal communication with a third input of the entropy coder with geometric extensions 145.

An output of the motion compensator with geometric extensions 170 is connected in signal communication with a first input of a switch 197. An output of the intra prediction module with geometric extensions 160 is connected in signal communication with a second input of the switch 197. An output of the macroblock-type decision module with geometric extensions 120 is connected in signal communication with a third input of the switch 197. An output of the switch 197 is connected in signal communication with a second non-inverting input of the combiner 127.

Inputs of the frame ordering buffer 110 and the encoder controller with geometric extensions 105 are available as input of the encoder 100, for receiving an input picture 101. Moreover, an input of the Supplemental Enhancement Information (SEI) inserter 130 is available as an input of the encoder 100, for receiving metadata. An output of the output buffer 135 is available as an output of the encoder 100, for outputting a bitstream.

Inter and Intra prediction using geometric region partitioning has been identified as a promising research direction on improving video coding efficiency. Previously, for advanced video coding (such as that performed in accordance with the MPEG-4 AVC Standard), it has been proposed to introduce a geometric partition for inter and intra prediction to improve video coding efficiency. To get the best performance, it is critical for the encoder to find the optimal geometric partition. A brute-force full search strategy is used in these proposals, but the complexity is very high. However, it is desirable to have some fast algorithms for mode/partition selection so the increased computational complexity for geometric partition does not become an obstacle to the practical system. Therefore, in accordance with the present principles, we have conceived fast geometric algorithms to save computational resources at the encoder. In one embodiment of the present principles, fast geometric mode decision is enabled for a video encoder using geometric model-based partitioning modes, wherein testing the geometric mode is skipped based on at least one of a correlation and dependence between standard prediction modes and geometric partition modes. In another embodiment of the present principles, fast geometric parameter selection is enabled for a video encoder using geometric model-based partitioning modes, wherein a predictive fast search algorithm is applied, which includes at least one of an initial predictor selection, an adaptive early termination and a predictor refinement. In yet another embodiment of the present principles, fast geometric parameter selection is enabled for a video encoder using geometric model-based partitioning modes, wherein a hierarchical search is used. In still another embodiment of the present principles, a video encoder using geometric model-based partitioning modes is enabled, wherein alternate optimization of geometric partition and prediction data is used.

As noted above, recent video compression technologies use frame partitioning, which is more efficient than the simple uniform block partition typically used in older video coding standards such as, for example, the International Organization for Standardization/International Electrotechnical Commission (ISO/IEC) Moving Picture Experts Group-2 (MPEG-2) standard. However, tree-based frame partition used in the MPEG-4 AVC Standard still does not code video information efficiently enough, as it is unable to capture the geometric structure of two-dimensional (2D) data. In order to solve such limitations, a method and apparatus are presented to better represent and code 2D video data by taking its 2D geometry into account. In one embodiment, we use a wedge partition (i.e., a partition of a block into two regions that are separated by an arbitrary line or curve) with respect to a new set of modes for both inter (INTER16×16GEO, INTER8×8GEO) and intra prediction (INTRA16×16GEO, INTRA8×8GEO).

In an embodiment, the MPEG-4 AVC Standard may be used as a basis to incorporate the geometric partition mode. Geometric partitions within blocks are modeled by the implicit formulation of a line. Hence, in an embodiment, partitions are defined as follows (as shown in FIG. 2):

$$f(x,y) = x\cos\theta + y\sin\theta - \rho,$$

where $\rho$, $\theta$ respectively denote the following: the distance from the origin to the boundary line $f(x,y)$ in the orthogonal direction to f(x,y); and the angle of the orthogonal direction to f(x,y) with the horizontal coordinate axis x.

Figure 2:
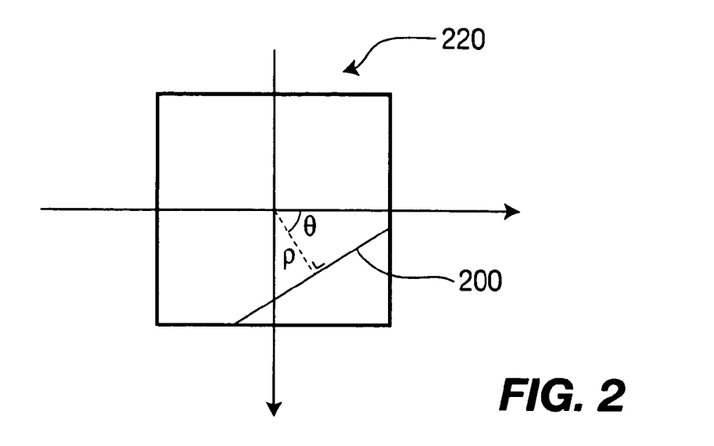
FIG. 2 is a diagram for an exemplary geometric boundary between two partitions, in accordance with an embodiment of the present principles.

Turning to FIG. 2, an exemplary geometric partitioning of an image is indicated generally by the reference numeral 200. The image block is indicated generally by the reference numeral 220.

It directly follows from its formulation that more involved models for f(x,y) with higher order geometric parameters are also considered.

Each block pixel (x,y) is classified such that:

$$GEO\_Partition = \begin{cases} \text{if } f(x, y) > 0 & \text{Partition 0} \\ \text{if } f(x, y) = 0 & \text{Line Boundary} \\ \text{if } f(x, y) < 0 & \text{Partition 1} \end{cases}$$

For coding purposes, a dictionary of possible partitions (or geometric modes) is a priori defined. This can be formally defined such that:

$$\rho : \rho \in \left(0, \frac{\sqrt{2} \, MB_{Size}}{2}\right) \text{ and } \rho \subset \{0, \Delta\rho, 2 \cdot \Delta\rho, 3 \cdot \Delta\rho, ...\},$$

and $$\theta : \begin{cases} \text{if } \rho = 0 & \theta \in [0, 180) \\ \text{else} & \theta \in [0, 360) \end{cases} \text{ and } \theta \subset \{0, \Delta\theta, 2 \cdot \Delta\theta, 3 \cdot \Delta\theta, ...\},$$

where $\Delta\rho$ and $\Delta\theta$ are the selected quantization (parameter resolution) steps. The quantized indices for $\theta$ and $\rho$ are the information transmitted to code the edge. However, if modes 16×8 and 8×16 are used in the coding procedure, angles 0 and 90, for the case of $\rho=0$, can be removed from the set of possible edges.

In a geometry-adaptive motion compensation mode, a search on $\rho$, $\theta$ and motion vectors for each partition is performed in order to find the best configuration. A full search strategy is done in two stages, for every $\rho$ and $\theta$ pair, where the best motion vectors are searched. Within the geometry-adaptive intra prediction mode, a search on $\rho$, $\theta$ and the best predictor (directional prediction or statistics, and so forth) for each partition is performed in order to find the best configuration.

At the encoder side, computational complexity for geometric mode can be very high if a full search is used. Thus, it is very critical to develop fast algorithms to reduce the encoder complexity for real applications.

In an embodiment, we use the framework of the MPEG-4 AVC Standard and Inter geometric partition for P pictures. However, it is to be appreciated that, given the teachings of the present principles provided herein, other embodiments of the present principles may be readily applied by one of ordinary skill in this and related arts to Intra geometric partitioning, other type of pictures, and other video coding standards and recommendations, and extensions thereof, while maintaining the spirit of the present principles. The present principles may be jointly applied with fast motion estimation and/or MPEG-4 AVC fast mode decision. For the coding cost measurement, we use RDcost as one example. However, it is to be appreciated that the present principles are not limited to solely the preceding type of coding cost measurement and, thus, other coding cost measurements can be applied including, but not limited to, a distortion only measurement (such as mean square error, and so forth) and so forth, while maintaining the spirit of the present principles.

For purposes of illustration and clarity, the present principles are classified into the following three categories: (1) fast mode decision based on correlation between the original MPEG-4 AVC Standard inter prediction modes and the geometric partition mode; (2) fast geometric partition selection within geometric partition mode; (3) fast geometric partition selection by alternate optimization of geometric partition and prediction date. It is to be appreciated that those categories can be jointly or independently applied.

1. Fast Mode Decision Based on Correlation Between the Original MPEG-4 AVC Standard Inter Prediction Modes and the Geometric Partition Mode.

In this category, the fast algorithm is performed to decide if we can completely skip testing the geometric mode. We will presume the MPEG-4 AVC Standard inter prediction modes are tested by the encoder before the geometric partition mode. We will further classify our algorithms under the first category into the following 5 sub-categories: (1) MPEG-4 AVC Standard mode decision; (2) early stop decision; (3) neighborhood decision; (4) residue decision; and (5) motion vector decision. Those sub-categories can be jointly or independently applied.

1.1. MPEG-4 AVC Standard Mode Decision

In this sub-category, we decide whether or not to skip testing the compression performance of the geometric mode based on the best and/or second best (if available) selected MPEG-4 AVC Standard models by the encoder. In an embodiment, the decision of this category is based on the presumption that, for example, if the encoder selects the geometric mode as the best mode for a macroblock, then the best MPEG-4 AVC Standard inter prediction mode is unlikely to be SKIP, 16×16 or intra mode. At the same time, at the sub 8×8 level, if the best sub-macroblock mode is 8×8 geometric mode, one can presume that the best MPEG-4 AVC Standard sub-macroblock mode is unlikely to be 8×8 (or Direct 8×8 if inter-B prediction is considered). At the macroblock size level, this is because SKIP and/or 16×16 means the macroblock probably is within the same object or motion regions and intra means the macroblock probably is an occluded object. The same applies for sub-macroblocks. In one embodiment, we first check if the best MPEG-4 AVC Standard mode is SKIP mode. If this is the case, the encoder skips testing the geometric mode, avoiding the edge and motion searches. If SKIP was not the best mode selected by the encoder, then the encoder checks if the best MPEG-4 AVC Standard mode is intra mode. If this is the case, then geometric mode is skipped. Otherwise, the encoder checks if the best MPEG-4 AVC Standard mode is 16×16. If this is the case, the encoder then checks the second best MPEG-4 AVC Standard mode. If it is SKIP mode, then we skip further testing the geometric mode. Otherwise, we test the geometric mode. Similarly, for sub-macroblocks, if the best MPEG-4 AVC Standard sub-macroblock mode is of 8×8 partition size, the encoder skips testing geometric sub-macroblock mode.

Figure 5A:
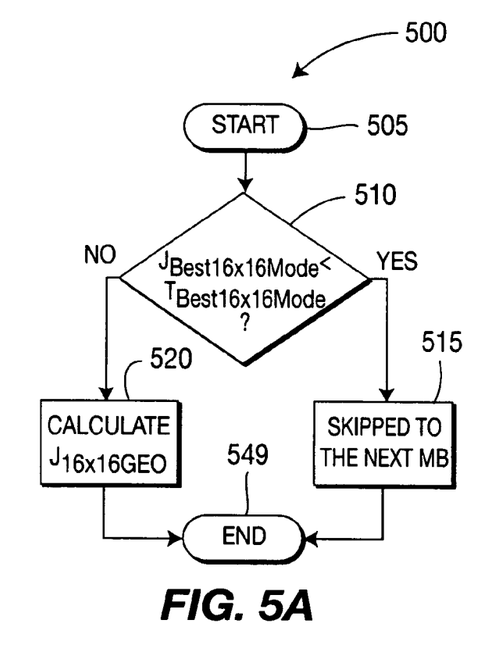
FIG. 5A is a flow diagram for an exemplary method for mode decision for a 16×16 geometric mode, in accordance with an embodiment of the present principles.

Turning to FIG. 5A, an exemplary method for mode decision for a 16×16 geometric mode is indicated generally by the reference numeral 500.

The method 500 includes a start block 505 that passes control to a decision block 510. The decision block 510 determines whether or not $J_{Best16 \times 16Mode} < T_{Best16 \times 16mode}$. If so, then control is passed to a function block 515. Otherwise, control is passed to a function block 520.

The function block 515 skips to the next macroblock, and passes control to an end block 549.

The function block 520 calculates $J_{16 \times 16GEO}$, and passes control to the end block 549.

Figure 5B:
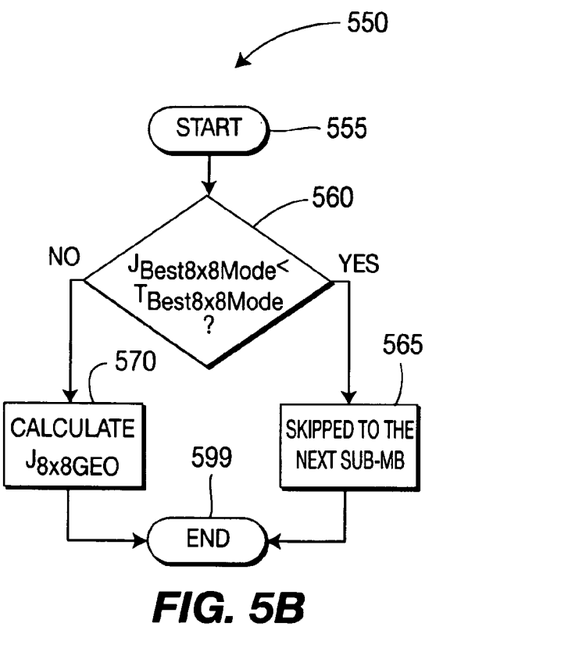
FIG. 5B is a flow diagram for an exemplary method for mode decision for a 8×8 geometric mode, in accordance with an embodiment of the present principles.

Turning to FIG. 5B, an exemplary method for mode decision for a 8×8 geometric mode is indicated generally by the reference numeral 550.

The method 550 includes a start block 555 that passes control to a decision block 560. The decision block 560 determines whether or not $J_{Best8\times8Mode} < T_{Best8\times8mode}$, where T stands for a threshold value. If so, then control is passed to a function block 565. Otherwise, control is passed to a function block 570.

The function block 516 skips to the next macroblock, and passes control to an end block 599.

The function block 570 calculates $J_{8\times8GEO}$, and passes control to the end block 599.

It is to be appreciated that the examples provided herein are readily extendable by one of ordinary skill in this and related arts to other combinations of best modes, given the teachings of the present principles provided herein. Moreover, it is to be appreciated that the maximum number of entries to take into account for prediction is not limited to the best and second best selected modes among a MPEG-4 AVC Standard prediction mode and, thus, other numbers of best selected modes may also be utilized, while maintaining the spirit of the present principles.

1.2. Early Stop Decision

In this sub-category, we propose to use early stopping criteria to reach fast mode decision. These stopping criteria are based on an adaptive thresholding mechanism. The threshold can be a function of quantization parameters, spatial/temporal neighboring rate-distortion cost (RDcost), and so forth. The basic scheme is to apply thresholds after testing all the possible MPEG-4 AVC Standard macroblock/sub-macroblock partition modes to decide whether or not to skip testing the 16×16 and/or 8×8 geometric partition modes. In one embodiment, we only test the best MPEG4 AVC Standard mode before applying 16×16/8×8 Geometric partition decisions. If the RDcost of the best MPEG-4 AVC Standard mode is less than a certain threshold, we skip testing geometric mode. Otherwise, we test geometric mode.

The fast geometric mode decision threshold can be chosen based on some safe guards or collected statistics from RDcost.

Figure 3A:
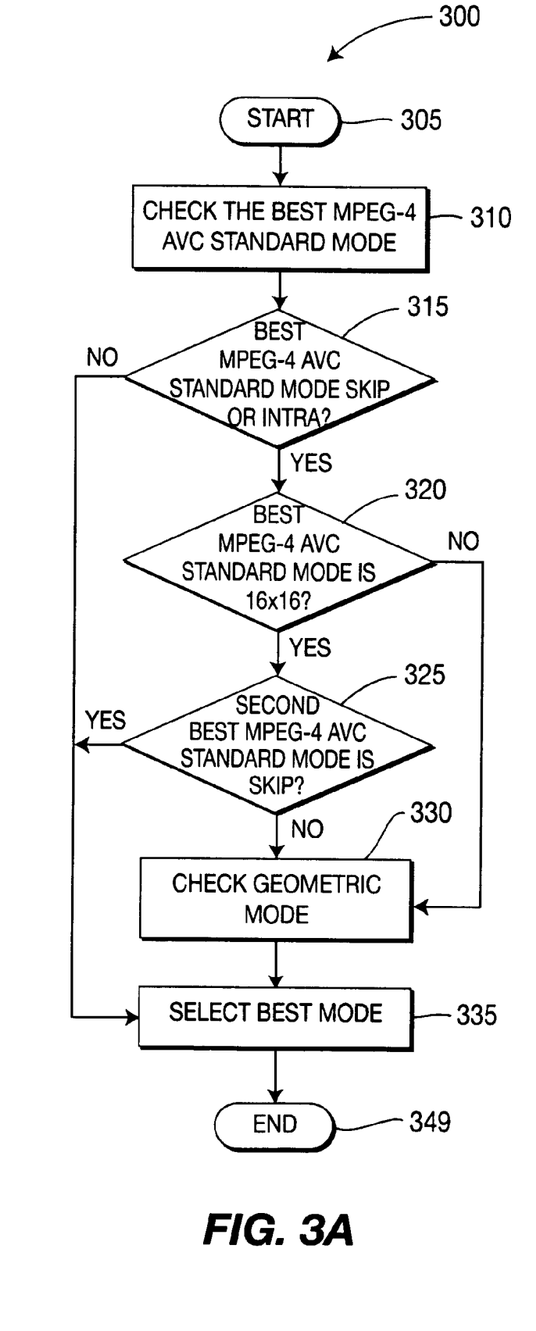
FIGS. 3A and 3B are flow diagrams for exemplary methods for fast geometric mode decision based on MPEG-4 AVC Standard mode information, in accordance with an embodiment of the present principles.
Figure 3B:
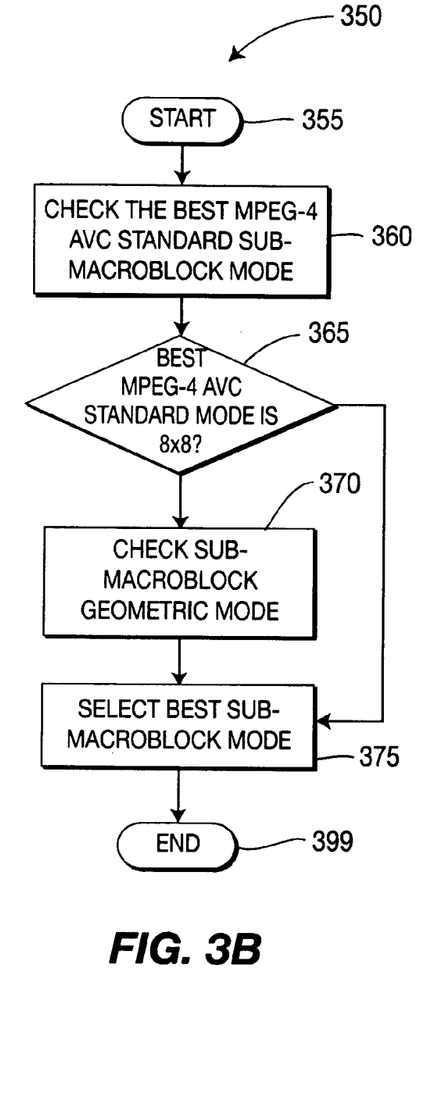

Turning to FIGS. 3A and 3B, exemplary methods for fast geometric mode decision based on MPEG-4 AVC Standard mode information are respectively indicated generally by the reference numerals 300 and 350.

The method 300 includes a start block 305 that passes control to a function block 310. The function block 310 checks the best MPEG-4 AVC Standard mode, and passes control to a decision block 315. The decision block 315 determines whether or not the best MPEG-4 AVC Standard mode is SKIP or intra. If so, then control is passed to a decision block 320. Otherwise, control is passed to a function block 335.

The decision block 320 determines whether or not the best MPEG-4 AVC Standard mode is 16×16. If so, then control is passed to a decision block 325. Otherwise, control is passed to a function block 330.

The decision block 325 determines whether or not the second best MPEG-4 AVC Standard mode is SKIP. If so, then control is passed to the function block 335. Otherwise, control is passed to the function block 330.

The function block 330 checks the geometric mode, and passes control to the function block 335.

The function block 335 selects the best mode, and passes control to an end block 349.

The method 350 includes a start block 355 that passes control to a function block 360. The function block 360 checks the best MPEG-4 AVC Standard sub-macroblock mode, and passes control to a decision block 365. The decision block 365 determines whether or not the best MPEG-4 AVC Standard mode is 8×8. If so, then control is passed to a function block 375. Otherwise, control is passed to a function block 370.

The function block 370 checks the sub-macroblock geometric mode, and passes control to the function block 375.

The function block 375 selects the best sub-macroblock mode, and passes control to an end block 399.

In another embodiment, we use the statistics from the best and the second best MPE-4 AVC Standard mode (if available) before 16×16/8×8 geometric partition decision. If the RDcost of the best MPEG-4 AVC Standard mode is less than a certain threshold, and the RDcost of the second best MPEG-4 AVC Standard mode is less than another threshold, we skip testing geometric mode. Otherwise, we test geometric mode.

Figure 4:
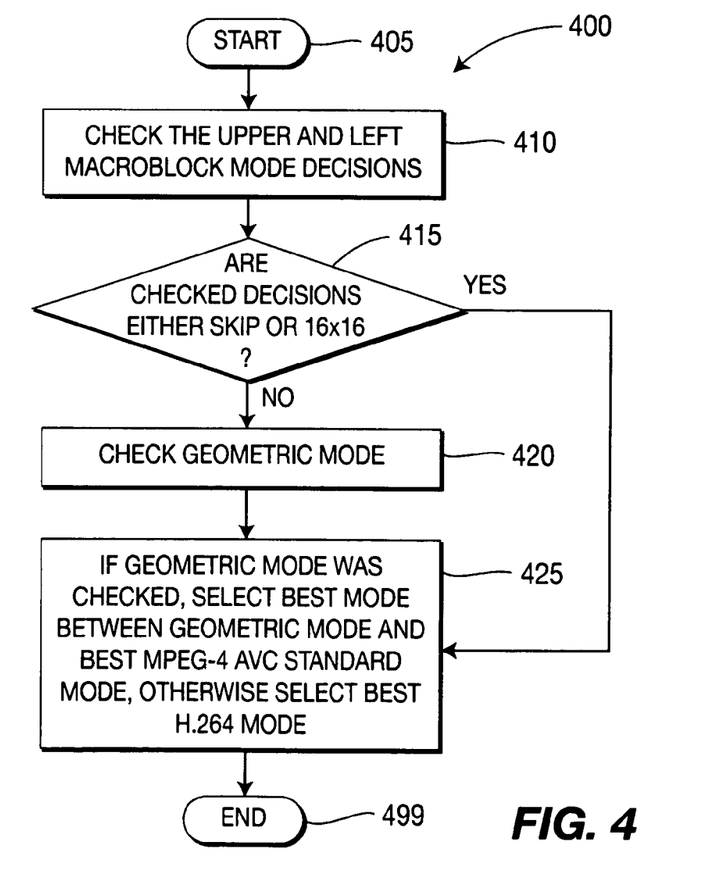
FIG. 4 is a flow diagram for an exemplary method for fast geometric mode decision based on neighboring information, in accordance with an embodiment of the present principles.

Turning to FIG. 4, an exemplary method for fast geometric mode decision based on neighboring information is indicated generally by the reference numeral 400.

The method 400 includes a start block 405 that passes control to a function block 410. The function block 410 checks the upper and left macroblock mode decision, and passes control to a decision block 415. The decision block 415 determines whether or not the mode decisions are SKIP or 16×16. If so, then control is passed to a function block 425. Otherwise, control is passed to a function block 420.

The function block 420 checks the geometric mode, and passes control to a function block 425.

The function block 425 selects the best mode between a geometric mode and a best mode from the MPEG-4 AVC Standard if a geometric mode was checked, otherwise selects the best mode from the MPEG-4 AVC Standard, and passes control to an end block 499.

In another embodiment, one could consider a combination between the approaches of the first and the second sub-categories of the first category, where a combination on the thresholding cost criteria and best selected mode criteria is used. Another possible approach is the use of the best mode and the second best mode as a conditional context for threshold adaptation. Decision thresholds for skipping or not testing geometric modes can be set depending on the combination of best and second best MPEG-4 AVC Standard modes.

1.3. Neighborhood Decision

The MPEG-4 AVC Standard uses a block coding structure. Often, objects tend to cross block boundaries. In this sub-category, we will make use of neighborhood information to make the mode decision faster.

If none of the spatial and/or temporal neighboring macroblocks include modes partitioning a given one or more of the macroblocks (e.g., 16×8, 8×16, 8×8, 8×4) (or a sub-block), the possibility of the best mode of the current macroblock (or sub-block) to be a geometric mode is low. In one embodiment, the encoder checks the left and upper neighboring macroblocks, if they are both SKIP or 16×16, the encoder skips testing geometric mode in the current macroblock. Otherwise, geometric mode is tested. In another embodiment, a combined decision rule taking into account neighbors and the current best MPEG-4 AVC Standard mode is considered.

Figure 6A:
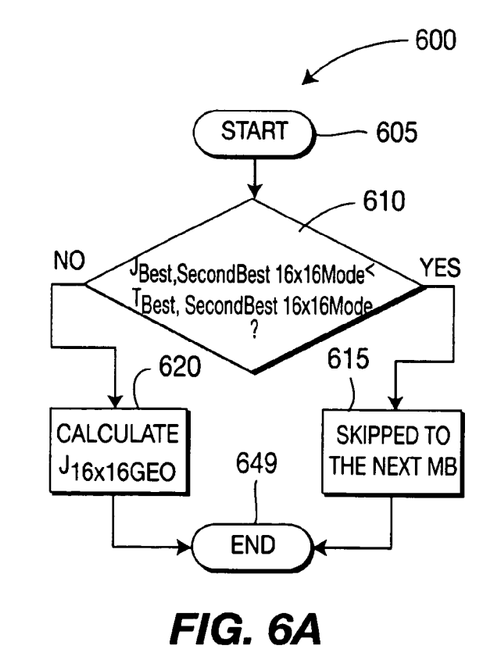
FIG. 6A is a flow diagram for an exemplary method for mode decision for a 16×16 geometric mode, in accordance with an embodiment of the present principles.

Turning to FIG. 6A, an exemplary method for mode decision for a 16×16 geometric mode is indicated generally by the reference numeral 600.

The method 600 includes a start block 605 that passes control to a decision block 610. The decision block 610 determines whether or not $J_{Best, SecondBest\ 16\times16Mode} < T_{Best, SecondBest\ 16\times16Mode}$, where T is a threshold. If so, then control is passed to a function block 615. Otherwise, control is passed to a function block 620.

The function block 615 skips to the next macroblock, and passes control to an end block 649.

The function block 620 calculates $J_{16\times16GEO}$, and passes control to the end block 649.

Figure 6B:
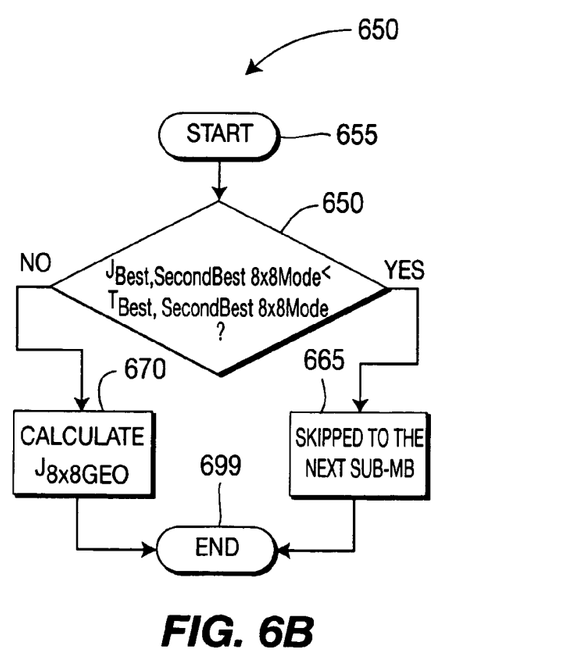
FIG. 6B is a flow diagram for an exemplary method for mode decision for a 8×8 geometric mode, in accordance with an embodiment of the present principles.

Turning to FIG. 6B, an exemplary method for mode decision for a 8×8 geometric mode is indicated generally by the reference numeral 650.

The method 650 includes a start block 655 that passes control to a decision block 660. The decision block 660 determines whether or not $J_{Best, SecondBest\ 8\times8Mode} < T_{Best, SecondBest\ 16\times16Mode}$, where T is a threshold. If so, then control is passed to a function block 665. Otherwise, control is passed to a function block 670.

The function block 665 skips to the next macroblock, and passes control to an end block 699.

The function block 670 calculates $J_{8\times8GEO}$, and passes control to the end block 699.

1.4. Residue Decision

The energy of the residue can be an indicator of prediction quality of a given macroblock. If the energy of the residue of the best MPEG-4 AVC Standard mode for the current macroblock is low enough, then the encoder can skip testing geometric mode. Similarly, if the energy of the residue of the best MPEG-4 AVC Standard sub-macroblock mode for the current sub-macroblock is low, we can skip testing sub-macroblock geometric mode. In one embodiment, we can compute the energy of the residue using absolute sum of the residue Discrete Cosine Transform (DCT) coefficients.

Figure 7:
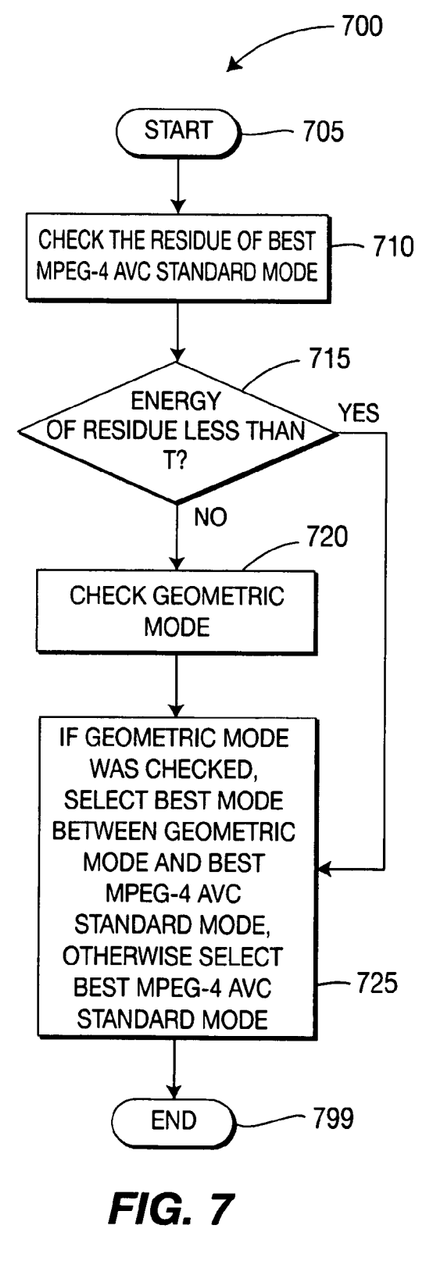
FIG. 7 is a flow diagram for an exemplary method for fast geometric mode decision based on residue information, in accordance with an embodiment of the present principles.

Turning to FIG. 7, an exemplary method for fast geometric mode decision based on residue information is indicated generally by the reference numeral 700.

The method 700 includes a start block 705 that passes control to a function block 710. The function block 710 checks the residue of the best MPEG-4 AVC Standard mode, and passes control to a decision block 715. The decision block 715 determines whether or not the energy of the residue is less than a threshold T. If so, then control is passed to a function block 725. Otherwise, control is passed to a function block 720.

The function block 720 checks the geometric mode, and passes control to the function block 725.

The function block 725 selects the best mode between a geometric mode and the best mode from the MPEG-4 AVC standard if a geometric mode was checked if a geometric mode was checked, otherwise selects the best mode from the MPEG-4 AVC Standard, and passes control to an end block 799.

1.5. Motion Vector Decision

Statistically, foregrounds tend to use more geometric modes than backgrounds, due to the fact that geometric modes mostly help when there are motion edges (i.e., backgrounds tend to be more static and/or have global motion). By analyzing the motion field of the best MPEG-4 AVC Standard mode with spatial and/or temporal neighboring macroblocks, an encoder can decide if we can skip testing geometric mode or not. In one embodiment, an encoder computes the variance of the best MPEG-4 AVC Standard motion vectors and neighboring motion vectors. If the variance is less than a threshold, the encoder skips testing geometric mode. Otherwise, geometric mode is tested.

Figure 8:
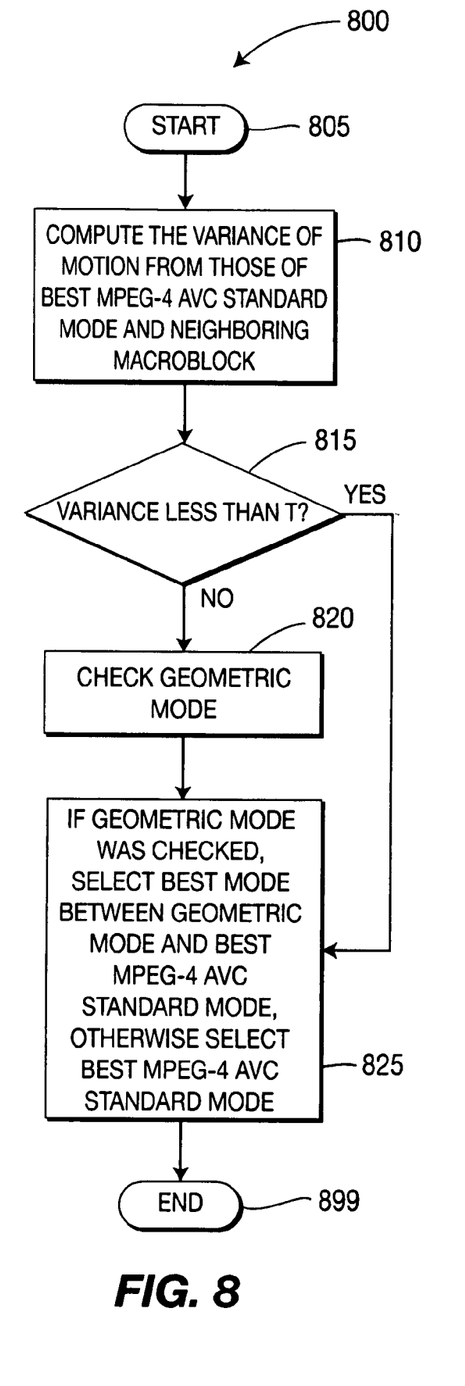
FIG. 8 is a flow diagram for an exemplary method for fast mode decision based on motion vector information, in accordance with an embodiment of the present principles.

Turning to FIG. 8, an exemplary method for fast mode decision based on motion vector information is indicated generally by the reference numeral 800.

The method 800 includes a start block 805 that passes control to a function block 810. The function block 810 computes the variance of motion from those of the best MPEG-4 AVC Standard mode and neighbor macroblocks, and passes control to a decision block 815. The decision block 815 determines whether or not the variance is less than a threshold T. If so, then control is passed to a function block 825. Otherwise, control is passed to a function block 820.

The function block 820 checks the geometric mode, and passes control to the function block 825.

The function block 825 selects the best mode between a geometric mode and the best mode from the MPEG-4 AVC Standard, otherwise selects the best mode from the MPEG-4 AVC Standard, and passes control to an end block 899.

2. Fast Wedge Selection within Geometric Partition Mode

In this category, one goal is to reduce the number of possible partitions we need to search for the geometric partition mode. A goal is to reduce the search space and minimize the chances that the optimization algorithm and retrieval of best coding mode and/or geometric partition gets trapped into local minima. The approach under this second category can be separated into the following two sub-categories: (1) predictive based algorithms; and (2) hierarchical search.

2.1. Predictive Algorithm

The predictive algorithm can be considered to primarily include the following three steps: (1) the initial predictor selection selects the best wedge from a set of potentially likely wedges; (2) the adaptive early termination allows the termination of the search at given stages if some rules are satisfied; and (3) the prediction refinement employs a refinement pattern around the best wedge predictor to improve the final prediction. The preceding three steps can be performed independently or jointly.

2.1.1 Predictor Selection

The goal is to utilize the pre-computed information to find the most probable wedges. We can divide our predictors into the following three groups: (1) predictors based on spatial and/or temporal correlation; (2) predictors based on the best MPEG-4 AVC Standard inter mode if it is available; and (3) fixed predictor grid.

With respect to the first group, namely predictors based on spatial and/or temporal correlation, we can extend the wedge partitions (or wedges) from spatial neighboring wedges and/or temporal neighboring wedges, and/or some functions of those wedges and use them as predictors.

With respect to the second group, namely predictors based on the best MPEG-4 AVC Standard inter mode if it is available, it is observed that there is strong correlation between the optimal geometric mode and the best MPEG-4 AVC Standard inter mode (e.g., 16×8 mode is likely to be the second best mode if an arbitrary geometric partition with an important horizontal direction is actually the best possible partition mode).

With respect to the third group, namely a fixed predictor grid, to avoid the situation where the optimization gets trapped into local minima, we can also test additional predictors. More specifically, we can design a set of predictors that are equally or more densely spaced around a prediction center. In one embodiment, we can set the fixed searching predictors with $\Delta\rho'=2\Delta\rho$ and $\Delta\theta'=4\Delta\theta$. We should note that not all of the above predictors are necessary in all cases. We can adaptively disable/enable some of the predictors depending on whether particular conditions are satisfied.

2.1.2 Adaptive Early Termination

We notice from simulations that the coding cost of adjacent blocks tends to be highly correlated. Based on this, a threshold can be set, such that the search algorithm can stop earlier if the coding cost of the current block crosses such a threshold. This significantly reduces the computational complexity. We can design two types of thresholds. One type of threshold may be used to select the optimal or suboptimal wedges from the set of the predictors. Another type of threshold may be used to decide whether or not the geometry mode will be finally selected as the best mode. The threshold can be designed using the RDcost of the spatial/temporal neighboring macroblock, and/or the RDcost of the best MPEG-4 AVC Standard mode if available.

One embodiment may be implemented as follows. After testing all spatial/temporal/MPEG-4 AVC Standard predictors, we will check whether the RDcost is less than a certain threshold $T_0$. If so, then we stop and select the best predictor as the final wedge for the geometric mode. Otherwise, we test the fixed predictors. If the RDcost (and/or coding cost) is less than $T_1$, then we will stop and select the best predictor as the final wedge for the geometric mode. Otherwise, we test if the RDcost is larger than $T_2$. If so, we will stop and set the MPEG-4 AVC Standard best mode as the best mode of the macroblock. Otherwise, we will refine our best wedge candidate.

2.1.3 Prediction Refinement

Wedge search can be further refined by using an iterative search pattern localized at the best predictor. We can apply all the search pattern ideas from fast motion estimation. In one embodiment, we can, for example, define the search pattern to be similar to a diamond search. Suppose the best predictor is $(\rho_0, \theta_0)$.

Step 1: test all the wedges paired with $\rho=\rho_0 \pm \Delta\rho$ and $\theta=\theta_0 \pm \Delta\theta$ within the search space.

Step 2: if the wedge with the minimum RDcost is $(\rho_0, \Theta_0)$, then we stop. Otherwise, go to step 1 by setting $(\rho_0, \theta_0)$ to the wedge with the minimum RDcost.

We can also apply a prediction refinement at the second or third best predictor to avoid getting trapped into a local minimum. Also, a hexagonal search can be applied for denser and better coverage of the parameter space. Of course, the present principles are not limited solely to diamond and hexagonal searches and, thus, other types of the searches may be used, while maintaining the spirit of the present principles.

Figure 9:
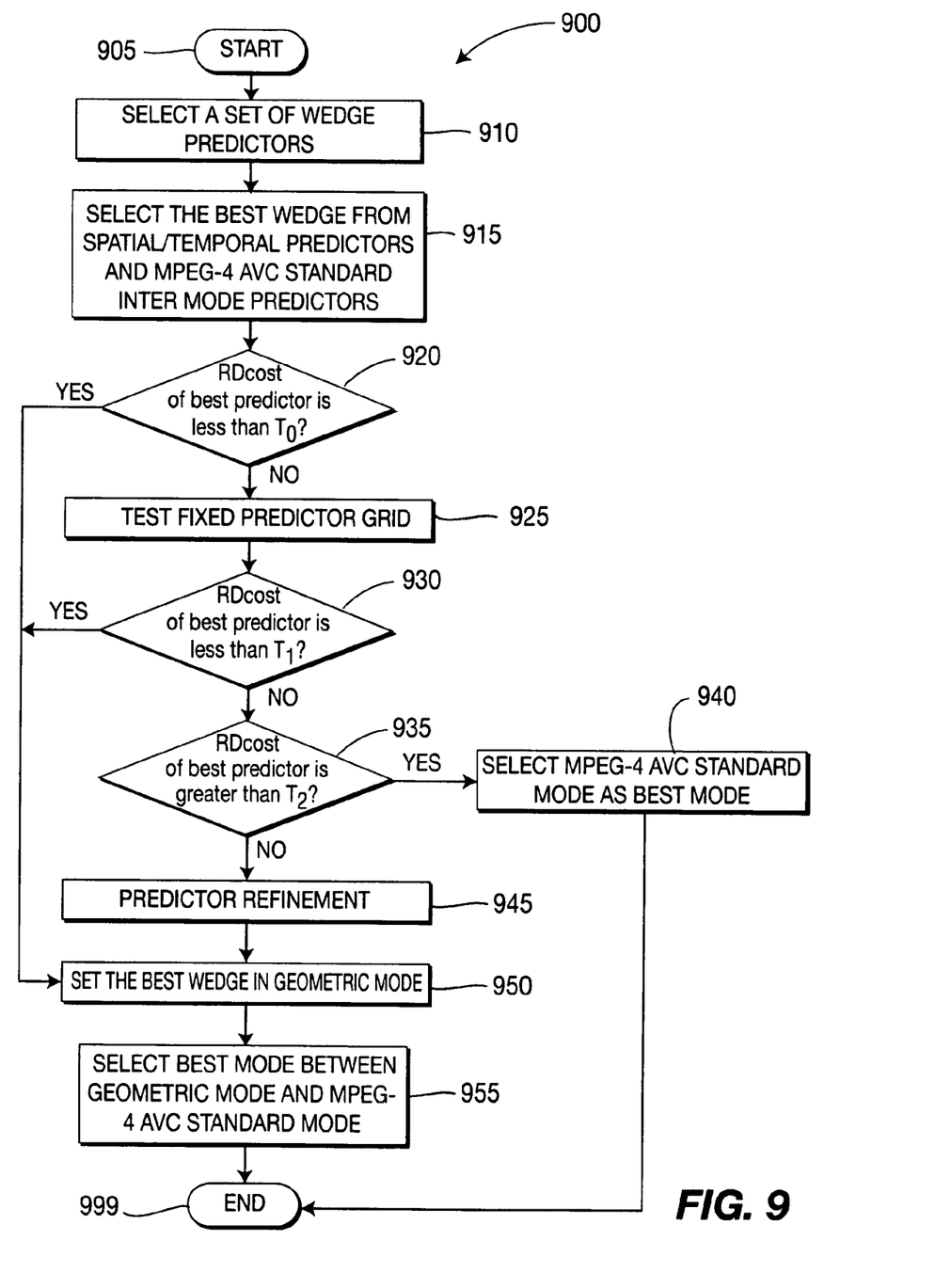
FIG. 9 is a flow diagram for an exemplary method for fast predictive geometric partitioning selection, in accordance with an embodiment of the present principles.

Turning to FIG. 9, an exemplary method for fast predictive wedge selection is indicated generally by the reference numeral 900.

The method 900 includes a start block 905 that passes control to a function block 910. The function block 910 selects a set of wedge predictors, and passes control to a function block 915. The function block 915 selects the best wedge from the spatial/temporal predictors and MPEG-4 AVC Standard inter mode predictors, and passes control to a decision block 920. The decision block 920 determines whether or not the RDcost of the best predictor is less than a threshold T0. If so, then control is passed to a function block 950. Otherwise, control is passed to a function block 925.

The function block 925 tests the fixed predictor grid, and passes control to a decision block 930. The decision block 930 determines whether or not the RDcost of the best predictor is less than a threshold T1. If so, then control is passed to the function block 950. Otherwise, control is passed to a decision block 935.

The decision block 935 determines whether or not the RDcost of the best predictor is larger than a threshold T2. If so, then control is passed to a function block 940. Otherwise, control is passed to a function block 945.

The function block 945 performs a predictor refinement, and passes control to a function block 950.

The function block 950 sets the best wedge in geometric mode, and passes control to a function block 955.

The function block 955 selects the best mode between the geometric mode and the MPEG-4 AVC mode, and passes control to an end block 999.

2.2 Hierarchical Search

In an embodiment, we can apply a hierarchical wedge search. The hierarchical wedge search involves building a hierarchical pyramid of wedge parameters. A full search or fast search pattern in 2.1.3 (prediction refinement) is first performed at a higher level of the pyramid with the smallest image resolution to find the best wedge. Then the wedge is refined until the lowest level of the pyramid is reached with the original image resolution. In another embodiment, a pyramidal search on the partition parameters can be also applied on the original resolution image. This means that the parameters defining the partition are iteratively refined in a hierarchical manner by improving (doubling) the resolution of partition parameters at every stage of the algorithm.

Figure 10:
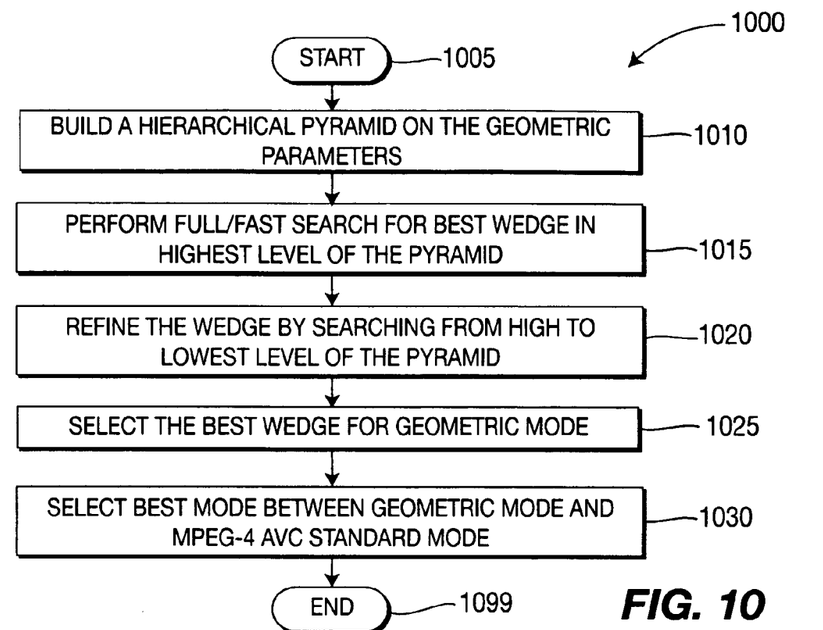
FIG. 10 is a flow diagram for an exemplary method for fast geometric partition selection using a hierarchical search, in accordance with an embodiment of the present principles.

Turning to FIG. 10, an exemplary method for fast wedge selection using a hierarchical search is indicated generally by the reference numeral 1000.

The method 1000 includes a start block 1005 that passes control to a function block 1010. The function block 1010 builds a hierarchical pyramid of parameters, and passes control to a function block 1015. The function block 1015 performs a full/fast search for the best wedge in the highest level of the pyramid, and passes control to a function block 1020. The function block 1020 refines the wedge from the highest to the lowest level of the pyramid, and passes control to a function block 1025. The function block 1025 selects the best wedge for the geometric mode, and passes control to a function block 1030. The function block 1030 selects the best mode between a geometric mode and a MPEG-4 AVC Standard mode, and passes control to an end block 1099.

Figure 11:
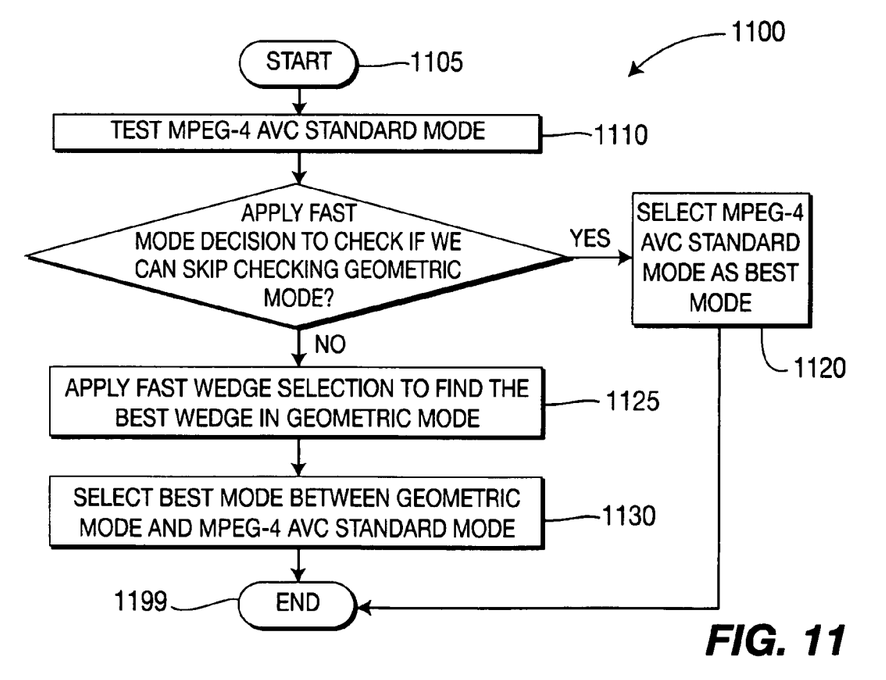
FIG. 11 is a flow diagram for an exemplary method for fast geometric mode and partitioning selection, in accordance with an embodiment of the present principles.

Turning to FIG. 11, an exemplary method for fast geometric mode and wedge selection is indicated generally by the reference numeral 1100.

The method 1100 includes a start block 1105 that passes control to a function block 1110. The function block 1110 test a MPEG-4 AVC Standard mode, and passes control to a decision block 1115. The decision block 1115 determines whether or not to apply the fast mode decision to check if we can skip checking the geometric mode. If so, then control is passed to a function block 1120. Otherwise, control is passed to a function block 1125.

The function block 1120 selects the MPEG-4 AVC Standard mode as the best mode, and passes control to an end block 1199.

The function block 1125 applies the fast wedge selection to find the best wedge in the geometric mode, and passes control to a function block 1130. The function block 1130 selects the best mode between the geometric mode and the MPEG-4 AVC Standard mode, and passes control to the end block 1199.

3. Fast Wedge Selection by Alternate Optimization of Geometric Partition and Prediction Data Another approach for fast joint prediction-partition parameters retrieval is the use of alternate optimization strategies. In an embodiment relating to the use of alternate optimization, an encoder searches alternatively for the best predictions for the partitions having fixed the wedge partition parameters, and then at the subsequent step, the encoder fixes the best predictors for the partitions retrieved until that point, and optimizes the wedge partition parameters such that at each step a measure of distortion and/or coding cost is minimized. This process is performed a given number of times depending upon at least one of a prefixed value and a measure on the optimization improvement with the number of iterations. It is to be appreciated that the initial settings used for the first iteration can significantly influence the final result of such an approach. In another embodiment, several initial conditions for alternate optimization of geometric partitions and prediction data are tested. The initial conditions are applied to geometric partitions parameters and/or prediction data parameters. The initial conditions may include, but are not limited to, one or more of the following: prefixed sampling on the parameter space for wedge partitions; prediction of wedge partition parameters based on available data of the surrounding neighborhood; fast motion search for inter prediction; and motion predictors.

Figure 12:
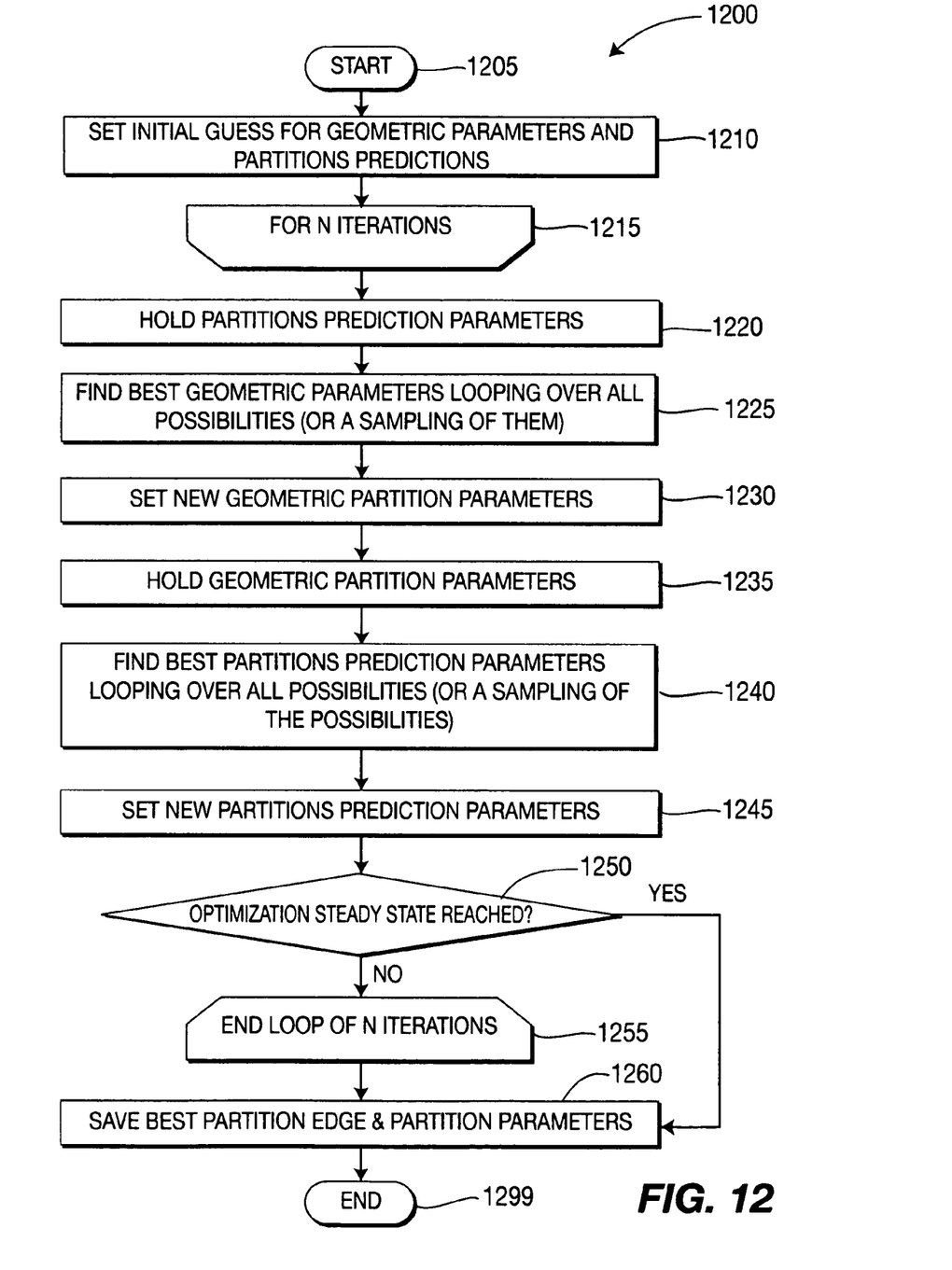
FIG. 12 is a flow diagram for an exemplary method for fast alternative prediction/partition parameter optimization, in accordance with an embodiment of the present principles.

Turning to FIG. 12, an exemplary method for fast alternative prediction/partition parameter optimization is indicated generally by the reference numeral 1200. It is to be appreciated that the method 1200 of FIG. 12 may be used in combination with one or more of the previously described approaches, while maintaining the spirit of the present principles.

The method 1200 includes a start block 1205 that passes control to a function block 1210. The function block 1210 sets the initial guess for the geometric parameters and partitions prediction, and passes control to a loop limit block 1215. The loop limit block 1215 sets a loop over N iterations, and passes control to a function block 1220. The function block 1220 holds the partitions prediction parameters, and passes control to a function block 1225. The function block 1225 finds the best geometric parameters looping over all possibilities (or a sampling thereof), and passes control to a function block 1230. The function block 1230 sets the new geometric partition parameters, and passes control to a function block 1235. The function block 1235 holds the geometric partition parameters, and passes control to a function block 1240. The function block 1240 finds the best partitions prediction parameters looping over all possibilities (or a sampling thereof), and passes control to a function block 1245. The function block 1245 sets new partitions prediction parameters, and passes control to a decision block 1250. The decision block 1250 determines whether or not steady state optimization has been reached. If so, the control is passed to a function block 1260. Otherwise, control is passed to a loop limit block 1255.

The loop limit block 1255 ends the loop over the N iterations, and passes control to a function block 1260.

The function block 1260 saves the best partition edge and partition parameters, and passes control to an end block 1299.

A description will now be given of some of the many attendant advantages/features of the present invention, some of which have been mentioned above. For example, one advantage/feature is a method that includes performing a non-exhaustive geometric mode decision using geometric model-based partitioning modes. The performing step includes skipping a testing of the geometric model-based partitioning modes based on at least one of a correlation and a dependence between the geometric model-based partitioning modes and non-geometric partitioning modes.

Another advantage/feature is the method as described above, wherein the non-exhaustive geometric mode decision uses at least one of non-geometric mode information, an early stopping threshold, neighborhood information, residue information, and motion vector information.

Yet another advantage/feature is the method as described above, wherein the early stopping threshold corresponds to at least one of a quantization parameter, a spatial neighboring rate-distortion cost, and a temporal neighboring rate-distortion cost.

Moreover, another advantage/feature is a method that includes performing a non-exhaustive geometric parameter selection using geometric model-based partitioning modes. The performing step includes applying at least one of a predictive search and a hierarchical search. The predictive search includes at least one of an initial predictor selection, an adaptive early termination, and a predictor refinement.

Further, another advantage/feature is the method as described above, wherein the initial predictor selection selectively enables at least one of predictors based on spatial correlation, predictors based on temporal correlation, predictors based on a best inter mode of a given coding standard or a given coding recommendation, and a fixed predictor grid.

Also, another advantage/feature is a method that includes encoding video signal data for an image using geometric model-based partitioning modes. The encoding step encodes the video signal data using an alternate optimization of geometric partition parameters and prediction data for at least a portion of the image.

These and other features and advantages of the present principles may be readily ascertained by one of ordinary skill in the pertinent art based on the teachings herein. It is to be understood that the teachings of the present principles may be implemented in various forms of hardware, software, firmware, special purpose processors, or combinations thereof.

Most preferably, the teachings of the present principles are implemented as a combination of hardware and software. Moreover, the software may be implemented as an application program tangibly embodied on a program storage unit. The application program may be uploaded to, and executed by, a machine comprising any suitable architecture. Preferably, the machine is implemented on a computer platform having hardware such as one or more central processing units ("CPU"), a random access memory ("RAM"), and input/output ("I/O") interfaces. The computer platform may also include an operating system and microinstruction code. The various processes and functions described herein may be either part of the microinstruction code or part of the application program, or any combination thereof, which may be executed by a CPU. In addition, various other peripheral units may be connected to the computer platform such as an additional data storage unit and a printing unit.

It is to be further understood that, because some of the constituent system components and methods depicted in the accompanying drawings are preferably implemented in software, the actual connections between the system components or the process function blocks may differ depending upon the manner in which the present principles are programmed. Given the teachings herein, one of ordinary skill in the pertinent art will be able to contemplate these and similar implementations or configurations of the present principles.

Although the illustrative embodiments have been described herein with reference to the accompanying drawings, it is to be understood that the present principles is not limited to those precise embodiments, and that various changes and modifications may be effected therein by one of ordinary skill in the pertinent art without departing from the scope or spirit of the present principles. All such changes and modifications are intended to be included within the scope of the present principles as set forth in the appended claims.

The invention claimed is:

1. An apparatus, comprising:
an encoder for performing a non-exhaustive geometric mode decision using geometric model-based partitioning modes, wherein said encoder skips a testing of the geometric model-based partitioning modes based on at least one of a correlation and a dependence between the geometric model-based partitioning modes and non-geometric partitioning modes.

2. The apparatus of claim 1, wherein the non-exhaustive geometric mode decision uses at least one of non-geometric mode information and neighborhood information.

3. The apparatus of claim 2, wherein the early stopping threshold corresponds to at least one of a spatial neighboring rate-distortion cost and a temporal neighboring rate-distortion cost.

4. In a video encoder, a method, comprising:
performing a non-exhaustive geometric mode decision using geometric model-based partitioning modes, wherein said performing step comprises skipping a testing of the geometric model-based partitioning modes based on at least one of a correlation and a dependence between the geometric model-based partitioning modes and non-geometric partitioning modes.

5. The method of claim 4, wherein the non-exhaustive geometric mode decision uses at least one of non-geometric mode information and neighborhood information.

6. The method of claim 5, wherein the early stopping threshold corresponds to at least one of a spatial neighboring rate-distortion cost and a temporal neighboring rate-distortion cost.

7. The apparatus of claim 1, wherein the non-exhaustive geometric mode decision uses residue information.

8. The apparatus of claim 1, wherein the non-exhaustive geometric mode decision uses motion vector information.

9. The apparatus of claim 1, wherein the non-exhaustive geometric mode decision uses an early stopping threshold.

10. The apparatus of claim 9, wherein the early stopping threshold corresponds to a quantization parameter.

11. The method of claim 4, wherein the non-exhaustive geometric mode decision uses residue information.

12. The method of claim 4, wherein the non-exhaustive geometric mode decision uses motion vector information.

13. The method of claim 4, wherein the non-exhaustive geometric mode decision uses an early stopping threshold.

14. The method of claim 13, wherein the early stopping threshold corresponds to a quantization parameter.

* * * * *